(12) United States Patent
Chang et al.

(10) Patent No.: US 11,117,323 B2
(45) Date of Patent: Sep. 14, 2021

(54) PHOTOCURING THREE-DIMENSIONAL MOLDING SYSTEM AND VAT HEATING DEVICE

(71) Applicant: DELTA ELECTRONICS, INC., Taoyuan (TW)

(72) Inventors: Keh-Su Chang, Taoyuan (TW); Yen-I Chou, Taoyuan (TW); Jau-Shiu Chen, Taoyuan (TW); Sheng-Kai Hsiao, Taoyuan (TW); Wei-Chih Hsiao, Taoyuan (TW); Chun-Fang Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 377 days.

(21) Appl. No.: 15/925,220

(22) Filed: Mar. 19, 2018

(65) Prior Publication Data

US 2018/0272606 A1    Sep. 27, 2018

Related U.S. Application Data (60) Provisional application No. 62/473,636, filed on Mar. 20, 2017.

(51) Int. Cl.
*B29C 64/295* (2017.01)
*B29C 35/08* (2006.01)
(Continued)

(52) U.S. Cl.
CPC ........ *B29C 64/295* (2017.08); *B29C 35/0805* (2013.01); *B29C 35/0888* (2013.01);
(Continued)

(58) Field of Classification Search
CPC ... B29C 64/295; B29C 64/135; B29C 64/264; B29C 64/255; B29C 64/245;
(Continued)

(56) References Cited

U.S. PATENT DOCUMENTS

| | | | | |
|---|---|---|---|---|
| 5,545,367 A | * | 8/1996 | Bae | B33Y 50/02 264/401 |
| 5,751,481 A | * | 5/1998 | Dalzell | B29C 51/428 264/1.32 |

(Continued)

FOREIGN PATENT DOCUMENTS

| | | |
|---|---|---|
| CN | 201070836 Y | 6/2008 |
| CN | 106042389 A | 10/2016 |

(Continued)

OTHER PUBLICATIONS

Office Action of corresponding TW Application No. 106135904 dated Aug. 3, 2018.

(Continued)

*Primary Examiner* — Leith S Shafi
(74) *Attorney, Agent, or Firm* — Muncy, Geissler, Olds and Lowe, P.C.

(57) ABSTRACT

A vat heating device is provided, including a vat and a heater. The vat has a bottom plate. The vat is used to accommodate a photosensitive resin. The heater is disposed on the bottom plate, adjacent to the photosensitive resin. The heater is used to heat the photosensitive resin. The heater is on an optical path of a light source for curing the photosensitive resin. A photocuring three-dimensional molding system containing the above vat heating device is also provided.

20 Claims, 10 Drawing Sheets

(51) Int. Cl.
    *B33Y 30/00*     (2015.01)
    *B29C 64/135*     (2017.01)
    *B29C 64/264*     (2017.01)
    *B29C 64/255*     (2017.01)
    *B29C 35/02*     (2006.01)
    *B29C 64/245*     (2017.01)
    *B33Y 70/00*     (2020.01)

(52) U.S. Cl.
    CPC .......... *B29C 64/135* (2017.08); *B29C 64/255* (2017.08); *B29C 64/264* (2017.08); *B33Y 30/00* (2014.12); *B29C 64/245* (2017.08); *B29C 2035/0211* (2013.01); *B29C 2035/0283* (2013.01); *B29C 2035/0827* (2013.01); *B29K 2909/08* (2013.01); *B29K 2995/0005* (2013.01); *B29K 2995/0026* (2013.01); *B33Y 70/00* (2014.12)

(58) Field of Classification Search
    CPC . B29C 64/124; B29C 64/205; B29C 35/0888; B29C 35/0805; B29C 2035/0211; B29C 2035/0827; B29C 2035/0283; B33Y 30/00; B33Y 70/00; B33Y 10/00; B29K 2909/08; B29K 2995/0005; B29K 2995/0026
    See application file for complete search history.

(56) References Cited

U.S. PATENT DOCUMENTS

| | | | | |
|---|---|---|---|---|
| 2002/0195746 | A1* | 12/2002 | Hull | B29C 64/124 |
| | | | | 264/401 |
| 2007/0075461 | A1* | 4/2007 | Hunter | B33Y 30/00 |
| | | | | 264/401 |
| 2008/0190905 | A1* | 8/2008 | Heinlein | B29C 64/153 |
| | | | | 219/121.73 |
| 2009/0068376 | A1* | 3/2009 | Philippi | B29C 64/153 |
| | | | | 427/532 |
| 2010/0326659 | A1* | 12/2010 | Schultz | E21B 43/12 |
| | | | | 166/297 |
| 2011/0045120 | A1* | 2/2011 | Higashi | B29C 33/3814 |
| | | | | 425/552 |
| 2014/0339741 | A1* | 11/2014 | Aghababaie | B33Y 30/00 |
| | | | | 264/401 |
| 2016/0020052 | A1 | 7/2016 | Moore et al. | |
| 2017/0036398 | A1 | 2/2017 | Gumennik et al. | |
| 2017/0334129 | A1* | 11/2017 | Ebert | B29C 64/124 |
| 2017/0355137 | A1* | 12/2017 | Ederer | B29C 64/165 |
| 2018/0079033 | A1* | 3/2018 | Krueger | B23K 15/0086 |
| 2018/0134029 | A1* | 5/2018 | Myerberg | A61K 6/807 |

FOREIGN PATENT DOCUMENTS

| | | |
|---|---|---|
| CN | 106324998 A | 1/2017 |
| DE | WO2016150721 A1 * | 9/2016 |
| EP | 3023226 A1 | 5/2016 |
| JP | H-0214133 A | 1/1990 |
| LI | WO2016078838 A1 * | 5/2016 |
| WO | WO2016007495 A1 | 1/2016 |

OTHER PUBLICATIONS

Search Report of corresponding EP Application No. 18162924.7 dated Aug. 21, 2018.
Office Action of corresponding CN Application No. 20170979458.X dated Nov. 5, 2019.
Office Action of corresponding TW Application No. 106135904 dated Feb. 24, 2020.
Office Action dated Dec. 14, 2020 in Chinese Application No. 201710979458.X, 8 pages.

* cited by examiner

PHOTOCURING THREE-DIMENSIONAL MOLDING SYSTEM AND VAT HEATING DEVICE

CROSS REFERENCE TO RELATED APPLICATIONS

This Application claims priority of U.S. Provisional Application No. 62/473,636, filed on Mar. 20, 2017, the entirety of which is incorporated by reference herein.

BACKGROUND

Technical Field

The present invention relates to a photocuring three-dimensional molding system for 3D printing, and in particular it relates to a vat heating device suitable for use in the above system.

Description of the Related Art 3D-printing (3DP), also known as additive manufacturing (AM), has been widely used in many fields such as mechanics, biomedicine, aerospace, etc. in recent years. 3D-printing can not only reduce costs, but it also has the tendency to replace existing processes, and it is thereby becoming a manufacturing technology for the new generation. Among the various 3D-printing technologies, the stereo-lithography apparatus (SLA) best meets the manufacturing accuracy and cost requirements. Therefore, in recent years, stereo-lithography technology has occupied a considerable market share in 3D-printing technology.

The photocuring molding technology uses a photosensitive resin as the material, and irradiates the photosensitive resin with ultraviolet light to generate a polymerization reaction, thereby curing and constructing a resin layer. Then, the cured resin layer is separated by a motor, and the platform is displaced to the next layer to cure the resin thereon. The steps of exposing, curing and separating are repeated to construct the printed object layer by layer.

In photocuring technology, temperature is one of the most important factors affecting the reaction efficiency and the quality of the molded product. For example, the temperature has a great influence on the viscosity of the resin. The resin to be cured is separated from the bottom of the vat in the above separation step. Thus, if the viscosity of the resin is too high, the drag force of the colloidal flow is too large, which will cause the cured product on the platform to fall off, resulting in the reduced printing yield of the machine. Therefore, how to control the reaction temperature of the photocuring molding technology to obtain a molded product with high yield and high chemical stability is an important issue.

In the prior art, in order not to affect the optical path of the light source, the heating device of the photocuring molding system is usually disposed at the peripheral component outside of the vat. As such, the photosensitive resin within the vat is indirectly heated by the heating device through the vat. The above heating mechanism has to be used through the component with poor thermal conductivity such as the vat, which leads to shortcomings such as poor heating efficiency, uneven temperature of the resin, etc. Therefore, a novel vat heating device of the photocuring three-dimensional molding system, which can directly and effectively control the reaction temperature of the photosensitive resin, is required so as to improve the quality and yield of 3D-printing.

BRIEF SUMMARY

According to some embodiments, the present invention provide a vat heating device, including a vat and a heater. The vat has a bottom plate and is used to accommodate a photosensitive resin. The heater is disposed on the bottom plate, adjacent to the photosensitive resin. The heater is used to heat the photosensitive resin. The heater is on an optical path of a light source for curing the photosensitive resin.

According to some embodiments, the present invention may provide a photocuring three-dimensional molding system, including a carrier, a vat, a heater, a platform, and a scanner. The vat is disposed on the carrier and has a bottom plate. The vat is used to accommodate a photosensitive resin. The heater is disposed on the bottom plate, adjacent to the photosensitive resin. The heater is used to heat the photosensitive resin, the platform is disposed over the vat. The scanner is disposed below the carrier. The scanner projects a light that passes through the carrier, the vat, and the heater to irradiate and cure the photosensitive resin inside the vat.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The embodiments of the present invention provide a photocuring three-dimensional molding system for 3D-printing, particularly a vat heating device for heating the photosensitive resin. By directly embedding the heater in the vat and/or in the platform and disposing the heater on an optical path of a light source, the photosensitive resin can be heated directly and uniformly, thereby effectively controlling the reaction temperature of the photosensitive resin to be cured.

Figure 1:
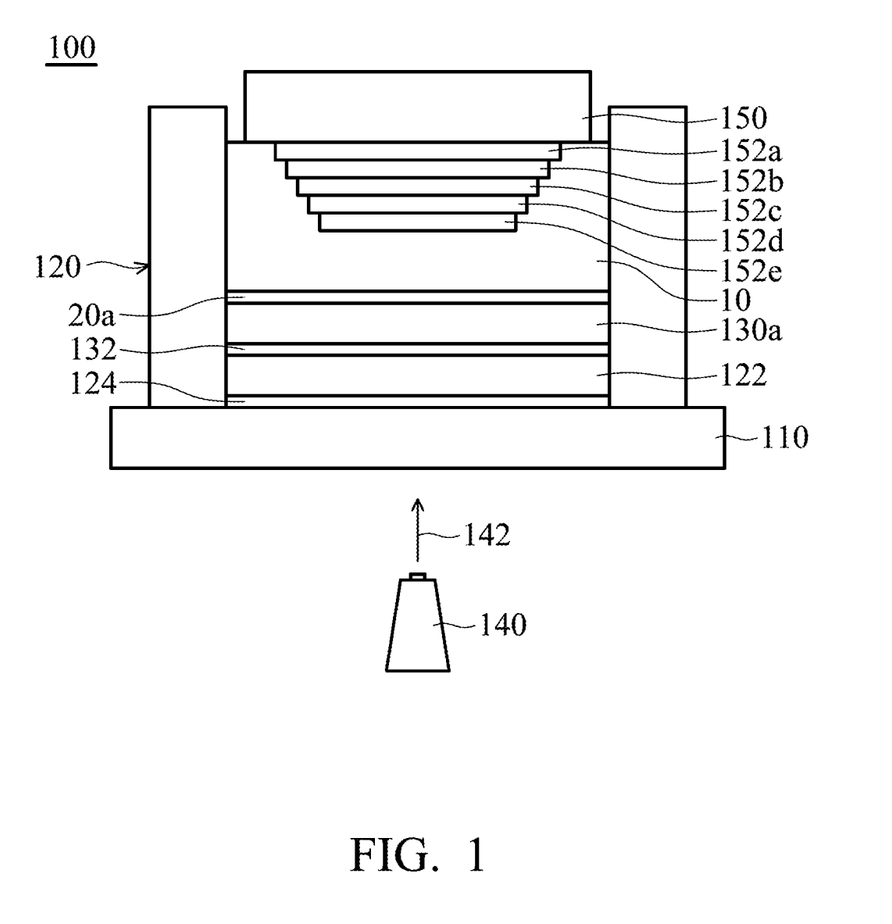
FIG. 1 illustrates a schematic view of a photocuring three-dimensional molding system in accordance with some embodiments.

FIG. 1 illustrates a schematic view of a photocuring three-dimensional molding system 100 in accordance with some embodiments. In an embodiment, as shown in FIG. 1, the photocuring three-dimensional molding system 100 includes a carrier 110, a vat 120, a heater 130a, a scanner 140 and a platform 150. In this embodiment, the heater 130a is embedded in the bottom of the vat 120.

First, referring to FIG. 1, a vat 120 includes a bottom plate 122 disposed on the carrier 110, and the vat 120 is used to accommodate a photosensitive resin 10. The photosensitive resin 10 is polymerized by irradiating with a light source 142 to be solidified from a liquid state to a solid state. In some embodiments, the photosensitive resin 10 may be acrylates, epoxies, other suitable materials, or a combination thereof, but not limited thereto. The material of the bottom plate 122 has a low absorptivity with respect to the wavelength of the light source 142 for curing the photosensitive resin 10, such that the light source 142 can pass through the bottom plate 122 to cure the photosensitive resin 10. In some embodiments, the bottom plate 122 may be an inorganic material or a plastic material that is transparent to the light source 142. For example, the transparent inorganic material may be glass, quartz, sapphire, or other suitable materials; the transparent plastic material may be polyoxymethylene (POM), polycarbonate (PC), polystyrene (PS), polypropylene (PP), polyethylene terephthalate (PET), olefin, styrene acrylonitrile (SAN), allyl diglycol carbonate (ADC, also known as CR-39), polymethylpentene (PMP), or other suitable materials.

Figure 7:
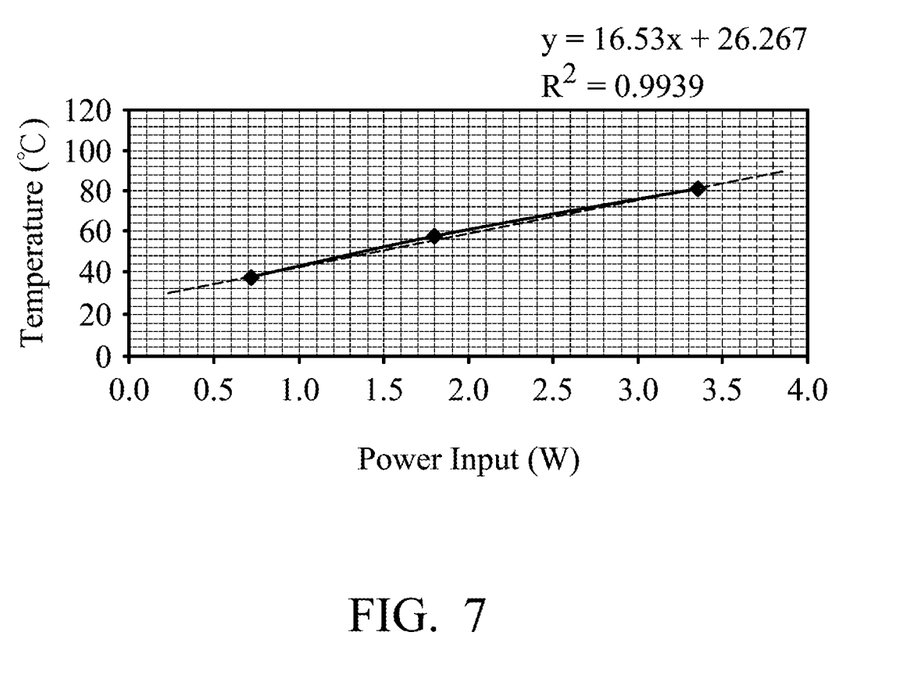
FIG. 7 illustrates temperature rise efficiency per watt of indium tin oxide (ITO) glass in accordance with some embodiments.

Still referring to FIG. 1, the heater 130a is embedded in the bottom of the vat 120 and on the bottom plate 122. The heater 130a is adjacent to the photosensitive resin 10 to heat the photosensitive resin 10. In some embodiments, the heater 130a may be a transparent conductive glass heater, and the transparent conductive glass may be, for example, an indium tin oxide (ITO) glass, a fluorine-doped tin oxide (FTO) glass, or other suitable materials. In this embodiment, a surface resistance of the heater 130a is in a range from 10 to 1000Ω/□. The heater 130a is applied with a voltage and then heated as a thermal resistance to provide a high-temperature portion. The temperature of the high-temperature portion may be in a range from 10° C. to 50° C., for example, from 25° C. to 30° C., In this embodiment, the temperature rise efficiency per watt of the heater 130a may be in a range from 1° C. to 40° C. For example, as shown in FIG. 7, the temperature rise efficiency per watt of the indium tin oxide (ITO) glass is 16° C., and the surface temperature of the indium tin oxide (ITO) glass rises steadily as the electric power input increases.

In the above embodiment, an isolation layer 20a may be additionally provided between the heater 130a and the photosensitive resin 10 as needed, such that the remaining photosensitive resin 10 after completing the molding can be easily removed from the heater 130a for cleaning. The material of the isolation layer 20a has a low absorptivity with respect to the wavelength of the light source 142 for curing the photosensitive resin 10, such that the light source 142 can pass through the isolation layer 20a to cure the photosensitive resin 10. In some embodiments, the isolation layer 20a may be an inorganic material or a transparent plastic material that is transparent to the light source 142. For example, the transparent inorganic material may be glass, quartz, sapphire, or other suitable materials; the transparent plastic material may be teflon, silicone, parylene, polyoxymethylene (POM), polycarbonate (PC), polystyrene (PS), polypropylene (PP), polyethylene terephthalate (PET), olefin, styrene acrylonitrile (SAN), allyl diglycol carbonate (ADC, also known as CR-39), polymethylpentene (PMP), or other suitable materials.

In another embodiment, the heater 130a may be a water bath to provide the photosensitive resin 10 with a high-temperature portion. The temperature of the high-temperature portion may be in a range from 10° C. to 50° C., for example, from 25° C. to 30° C. In this embodiment, the water bath may be a temperature-controlled water bath. Specifically, the temperature-controlled water bath may include a bath body with a transparent bottom and a temperature control device disposed at the transparent bottom to control the temperature of the water bath. In other embodiments, the fluid used for heating may be another transparent fluid other than water. In the embodiment using the water bath, an isolation layer 20a is additionally provided between the heater 130a and the photosensitive resin 10 so as to separate the water bath from the photosensitive resin. The material of the isolation layer 20a may be the same as above, and details are not described herein again.

It should be noted that the heater 130a is adjacent to the photosensitive resin 10 so that the heater 130a may provide the photosensitive resin 10a with a heat source to have a planar and uniform high-temperature portion, and the heat source may directly cover the layer of the photosensitive resin to be cured (i.e., about 5-200 μm thickness of the photosensitive resin). Thus, the heater 130a can control the temperature of the layer of the photosensitive resin to be cured, and utilize the temperature gradient caused by the heat flux to stably maintain the reaction temperature of the photosensitive resin to be cured. Based on the above, unlike indirect heating with the conventional thermal resistance, the heater 130a provided by the embodiments of the present invention can provide the vat 120 with a stable ambient temperature. Therefore, the photocuring three-dimensional molding system 100 can be prevented from being affected by the ambient temperature or the climate of different latitudes so as to ensure the quality of the molded product.

In the photocuring molding technique, a print object is constructed by curing the photosensitive resin layer-by-layer through a chemical polymerization. The propagation reaction in the polymerization reaction is a key reaction that determines the polymerization characteristics, and the reaction constant is temperature dependent. Thus, the temperature will affect the polymerization rate, conversion rate and final properties of the material in the photocuring molding technique. That is, in addition to affecting the reaction efficiency of the photocuring process, the temperature also affects the material properties of the cured product.

Still referring to FIG. 1, the scanner 140 is disposed below the carrier 110. The scanner 140 projects the light source 142 which passes through the carrier 110, the bottom plate 122 of the vat 120, the heater 130a and the platform 150 to irradiate and cure the photosensitive resin 10 inside the vat 120. That is, the heater 130a is on the optical path of the light source 142 for curing the photosensitive resin 10. Furthermore, as shown in FIG. 1, the platform 150 is disposed above the vat 120, and the platform 150 is a lifting platform. The photosensitive resin 10 is cured by the light source 142 so as to form the curing layers 152a, 152b, 152c, 152d, and 152e layer-by-layer below the platform 150.

It should be noted that, in this embodiment, since the first cured curing layer 152a is farthest from the heater 130a, the reaction temperature is lower so that the cured product is softer. In contrast, the closer the curing layers 152b, 152c, 152d and 152e are to the heater 130a, the higher the reaction temperature is, so that the harder the cured product is and the better the reaction efficiency is.

Figure 8:
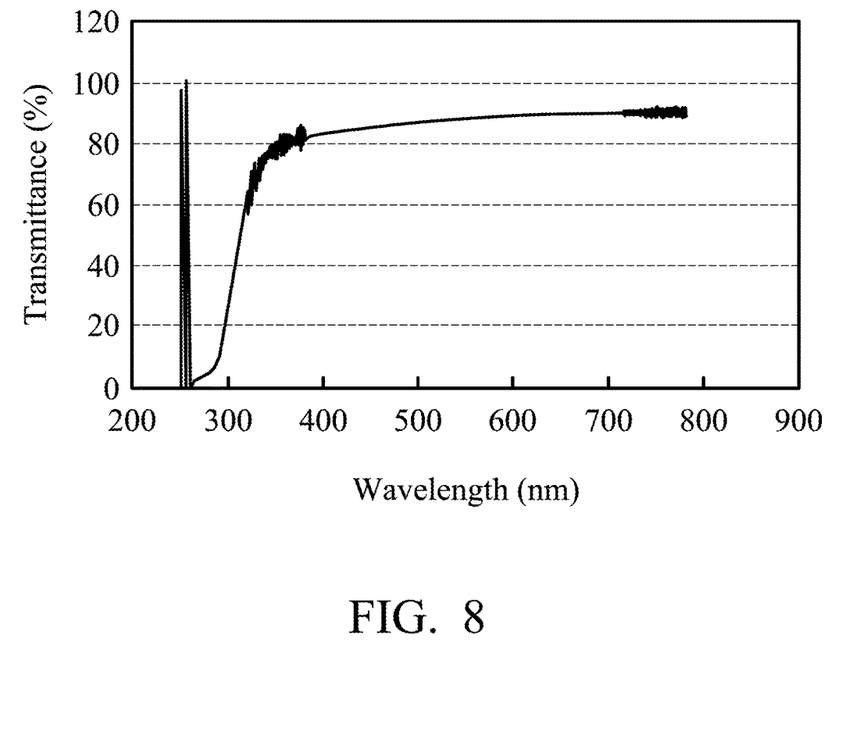
FIG. 8 illustrates a transmittance of indium tin oxide (ITO) glass in a spectral range of an ultraviolet light according to some embodiments.

In some embodiments, the light source 142 may be an ultraviolet light, for example, ultraviolet light having a wavelength of 300 nm-450 nm, but not limited thereto. In some embodiments, the heater 130a has a transmittance of 55% to 90% in the spectral range of ultraviolet light. For example, as shown in FIG. 8, an indium tin oxide (ITO) glass has a transmittance of 70% to 85% in the spectral range of 350 nm to 450 nm. In some embodiments, the bottom surface of the bottom plate 122 and/or the heater 130a may be coated with the anti-reflection coating 124 and/or the anti-reflection coating 132 so as to reduce the energy loss of the light source 142 caused by passing through the bottom plate 122 and the heater 130a. In some embodiments, the material of the anti-reflection coating may be tetraethoxysilane (TEOS), diethoxymethylsilane (MDEOS), dimethyldiethoxylsilane (DMDEOS), diphenyldiethoxysilane (PDEOS), vinyltriethoxysilane (VTEOS), aminopropyltriethoxysilane (APTEOS), other suitable materials, or a combination thereof.

It should be noted that since the heater 130a is transparent and ultraviolet light can pass through it, the heater 130a can be disposed on the optical path of the light source 142 to directly heat the photosensitive resin, thereby effectively controlling the reaction temperature of the photosensitive resin.

Figure 2A:
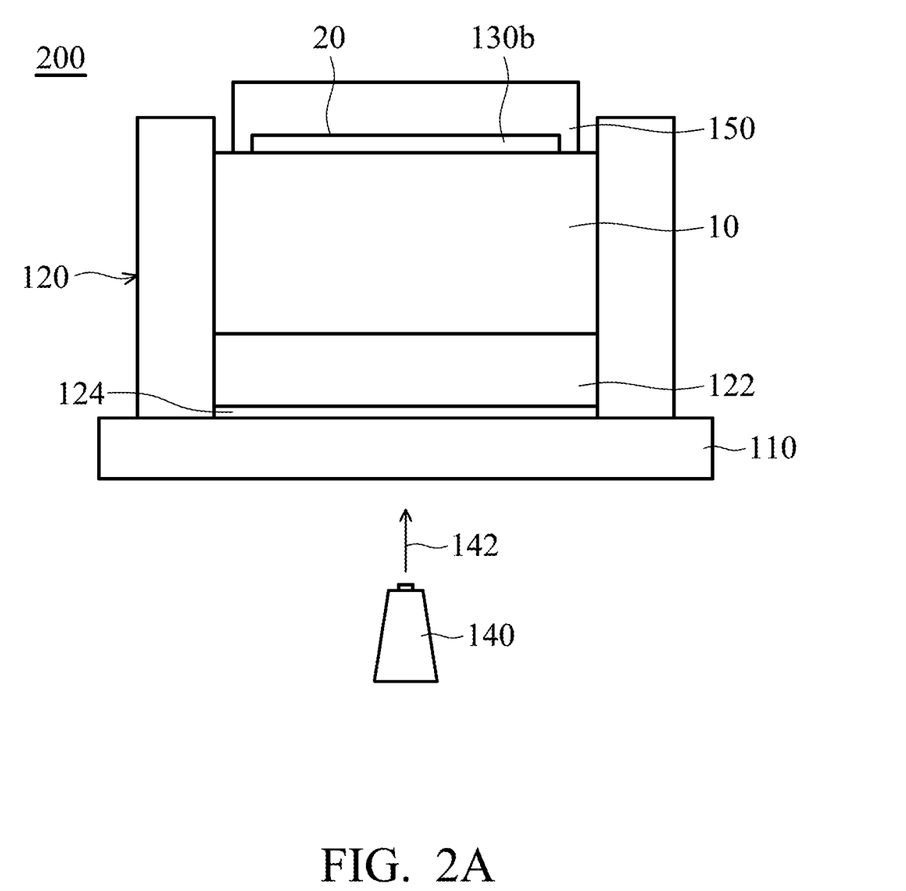
FIGS. 2A-2B illustrate schematic views of a photocuring three-dimensional molding system in accordance with other embodiments.
Figure 2B:
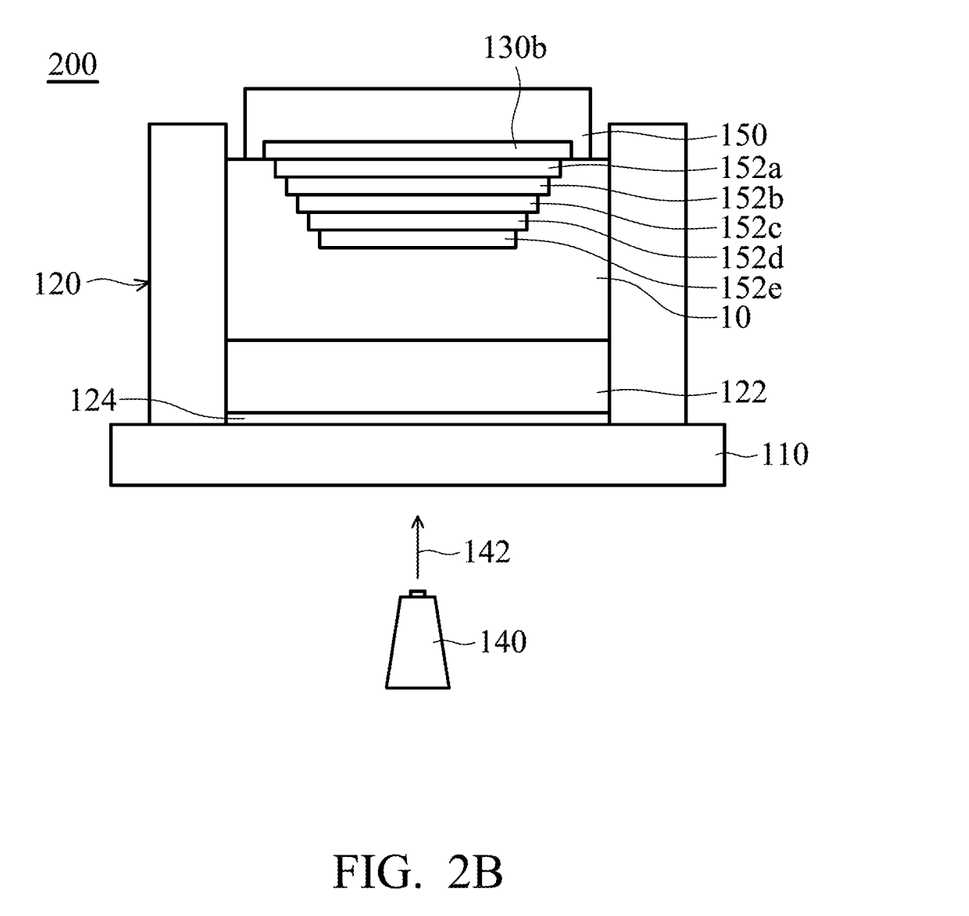

FIGS. 2A-2B illustrate schematic views of a photocuring three-dimensional molding system 200 in accordance with other embodiments. Referring to FIGS. 2A-2B, the photocuring three-dimensional molding system 200 is substantially similar to the photocuring three-dimensional molding system 100 of the above embodiments, except that the heater 130b of the photocuring three-dimensional molding system 200 is embedded in the platform 150.

Specifically, as shown in FIG. 2A, the heater 130b is embedded in the platform 150 and adjacent to the photosensitive resin 10 to heat the photosensitive resin 10. Then, as shown in FIG. 2B, the photosensitive resin 10 is cured by the light source 142 to form the curing layers 152a, 152b, 152c, 152d, and 152e layer-by-layer below the platform 150.

It should be noted that in this embodiment, as shown in FIG. 2B, since the first cured curing layer 152a is closest to the heater 130b, the reaction temperature is higher so that the cured product is harder and the reaction efficiency is better. In contrast, the farther the curing layers 152b, 152c, 152d and 152e are from the heater 130b, the lower the reaction temperature is, so that the softer the cured product is.

Figure 3A:
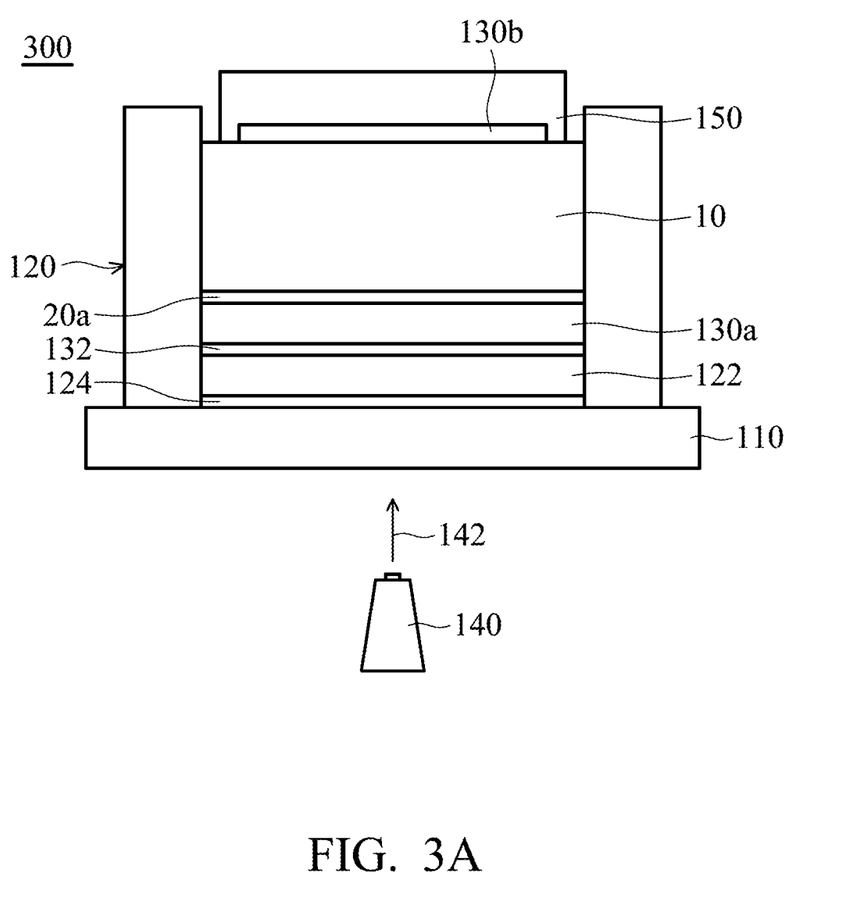
FIGS. 3A-3B illustrate schematic views of a photocuring three-dimensional molding system in accordance with yet other embodiments.
Figure 3B:
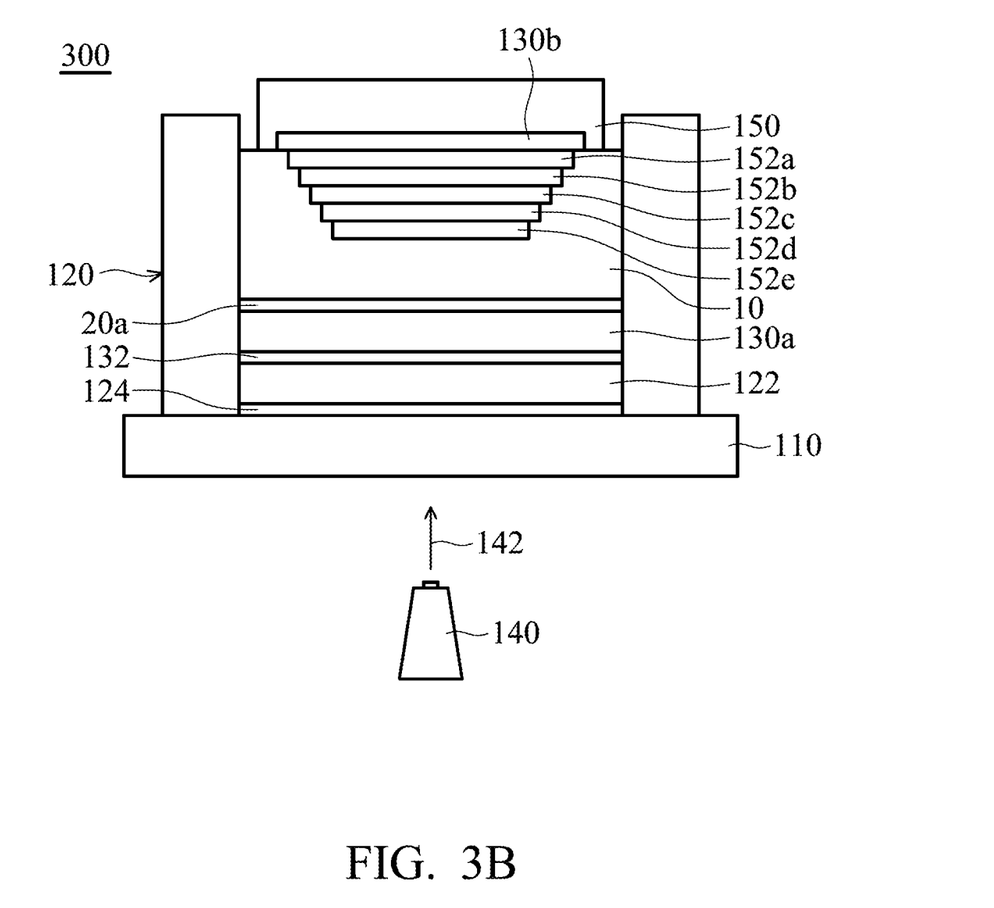

FIGS. 3A-3B illustrate schematic views of a photocuring three-dimensional molding system 300 in accordance with yet other embodiments. Referring to FIGS. 3A-3B, the photocuring three-dimensional molding system 300 is substantially similar to the photocuring three-dimensional molding system 100 of the above embodiments, except that in the photocuring three-dimensional molding system 300, in addition to embedding the heater 130a in the bottom of the vat 120, the heater 130b is further embedded in the platform 150.

Specifically, as shown in FIG. 3A, the heater 130a is embedded in the bottom of the vat 120 and on the bottom plate 122, and the heater 130b is embedded in the platform 150. Both the heater 130a and the heater 130b are adjacent to the photosensitive resin 10 to heat the photosensitive resin 10. Then, as shown in FIG. 3B, the photosensitive resin 10 is cured by the light source 142 to form the curing layers 152a, 152b, 152c, 152d, and 152e layer-by-layer below the platform 150.

Figure 4:
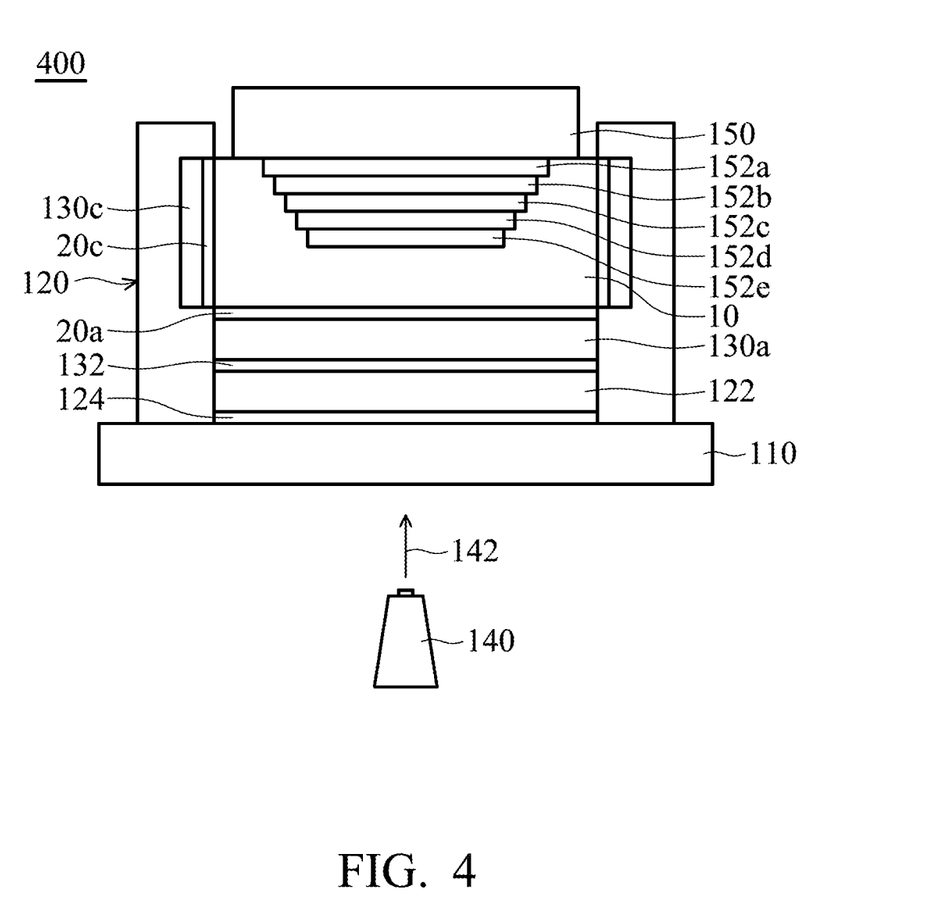
FIG. 4 illustrates a schematic view of a photocuring three-dimensional molding system in accordance with yet other embodiments.

FIG. 4 illustrates a schematic view of a photocuring three-dimensional molding system 400 in accordance with yet other embodiments. Referring to FIG. 4, the photocuring three-dimensional molding system 400 is substantially similar to the photocuring three-dimensional molding system 100 of the above embodiments, except that in the photocuring three-dimensional molding system 400, in addition to embedding the heater 130a in the bottom of the vat 120, the heater 130c is further embedded in the sidewall of the vat 120.

Specifically, as shown in FIG. 4, the heater 130a is embedded in the bottom of the vat 120 and on the bottom plate 122, and the heater 130c is embedded in the sidewall of the vat 120. Both the heater 130a and the heater 130c are adjacent to the photosensitive resin 10 to heat the photosensitive resin 10. Then, the photosensitive resin 10 is cured by the light source 142 to form the curing layers 152a, 152b, 152c, 152d, and 152e layer-by-layer below the platform 150. In this embodiment, an isolation layer 20c may be additionally provided between the heater 130c and the photosensitive resin 10 as needed, such that the remaining photosensitive resin 10 after completing the molding can be easily removed for cleaning. The material of the isolation layer 20c may be the same as above, and details are not described herein again.

Figure 5:
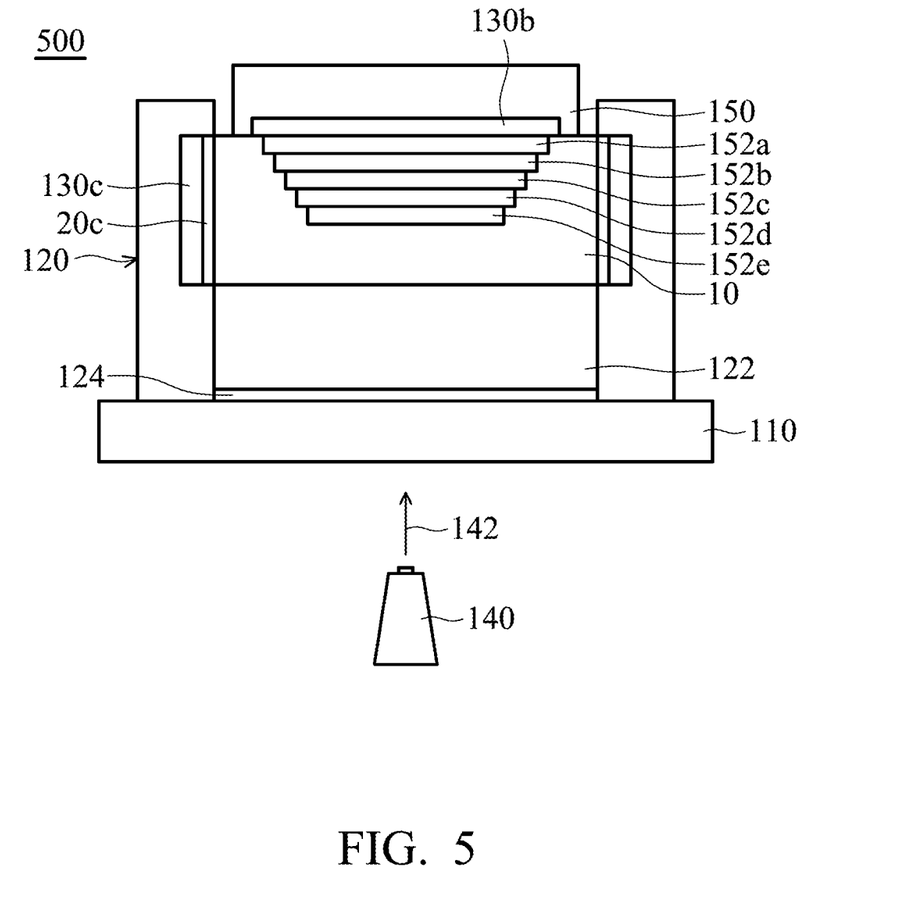
FIG. 5 illustrates a schematic view of a photocuring three-dimensional molding system in accordance with yet other embodiments.

FIG. 5 illustrates a schematic view of a photocuring three-dimensional molding system 500 in accordance with yet other embodiments. Referring to FIG. 5, the photocuring three-dimensional molding system 500 is substantially similar to the photocuring three-dimensional molding system 200 of the above embodiments, except that in the photocuring three-dimensional molding system 500, in addition to embedding the heater 130b in the platform 150, the heater 130c is further embedded in the sidewall of the vat 120.

Specifically, as shown in FIG. 5, the heater 130b is embedded in the platform 150 and the heater 130c is embedded in the sidewall of the vat 120. Both the heater 130b and the heater 130c are adjacent to the photosensitive resin 10 to heat the photosensitive resin 10. Then, the photosensitive resin 10 is cured by the light source 142 to form the curing layers 152a, 152b, 152c, 152d, and 152e layer-by-layer below the platform 150. In this embodiment, an isolation layer 20c may be additionally provided between the heater 130c and the photosensitive resin 10 as needed, such that the remaining photosensitive resin 10 after completing the molding can be easily removed for cleaning. The material of the isolation layer 20c may be the same as above, and details are not described herein again.

Figure 6:
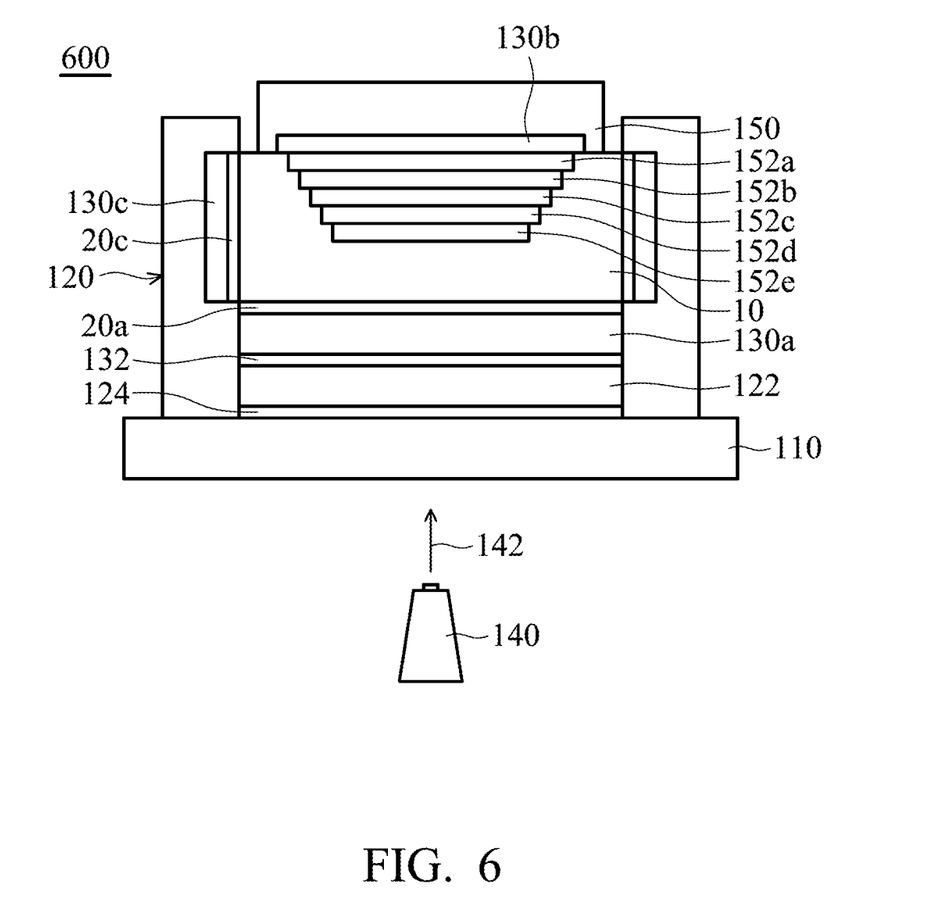
FIG. 6 illustrates a schematic view of a photocuring three-dimensional molding system in accordance with yet other embodiments.

FIG. 6 illustrates a schematic view of a photocuring three-dimensional molding system 600 in accordance with yet other embodiments. Referring to FIG. 6, the photocuring three-dimensional molding system 600 is substantially similar to the photocuring three-dimensional molding system 400 of the above embodiments, except that in the photocuring three-dimensional molding system 600, in addition to embedding the heater 130a in the bottom of the vat 120 and embedding the heater 130c in the sidewall of the vat 120, the heater 130b is further embedded in the platform 150.

Specifically, as shown in FIG. 6, the heater 130a is embedded in the bottom of the vat 120 and on the bottom plate 122, the heater 130b is embedded in the platform 150, and the heater 130c is embedded in the sidewall of the vat 120. The heater 130a, the heater 130b and the heater 130c are adjacent to the photosensitive resin 10 to heat the photosensitive resin 10. Then, the photosensitive resin 10 is cured by the light source 142 to form the curing layers 152a, 152b, 152c, 152d, and 152e layer-by-layer below the platform 150.

It should be noted that in the embodiments shown in FIGS. 4 to 6, since the heater 130c is additionally embedded in the sidewall of the vat 120, the photosensitive resin can be heated more stably and uniformly, thereby effectively controlling the reaction temperature of the photosensitive resin.

In summary, the embodiments of the present invention provide a photocuring three-dimensional molding system for 3D-printing, particularly a vat heating device for heating the photosensitive resin. Since the heater of the vat heating device is transparent and light can pass through it, the heater can be directly disposed on the optical path of the light source for curing the photosensitive resin. Furthermore, by embedding the heater in the vat and/or in the platform and making the heater adjacent to the photosensitive resin, the photosensitive resin can be heated stably and uniformly, thereby effectively controlling the reaction temperature of the photosensitive resin to be cured.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A vat heating device, comprising:
    a vat having a bottom plate and used to accommodate a photosensitive resin;
    a first heater disposed on the bottom plate, and adjacent to the photosensitive resin to heat the photosensitive resin;
    a platform disposed above the vat; and
    a second heater embedded in the platform,
    wherein the first heater and the second heater are on an optical path of a light source for curing the photosensitive resin,
    wherein a bottom surface of the bottom plate has an anti-reflection coating, and
    wherein a material of the anti-reflection coating comprises tetraethoxysilane (TEOS), diethoxymethylsilane (MDEOS), dimethyldiethoxylsilane (DMDEOS), diphenyldiethoxysilane (PDEOS), vinyltriethoxysilane (VTEOS), aminopropyltriethoxysilane (APTEOS) or a combination thereof.

2. The vat heating device as claimed in claim 1, wherein the first heater is a transparent conductive glass.

3. The vat heating device as claimed in claim 2, wherein the transparent conductive glass is indium tin oxide (ITO) glass or fluorine-doped tin oxide (FTO) glass.

4. The vat heating device as claimed in claim 2, wherein a surface resistance of the first heater is 10-1000Ω/□.

5. The vat heating device as claimed in claim 1, wherein the first heater is embedded in a bottom of the vat.

6. The vat heating device as claimed in claim 5, further comprising a third heater, and the third heater is embedded in a sidewall of the vat.

7. The vat heating device as claimed in claim 5, wherein a bottom surface of the first heater has an anti-reflection coating.

8. The vat heating device as claimed in claim 5, further comprising:
    an isolation layer disposed between the first heater and the photosensitive resin.

9. The vat heating device as claimed in claim 8, wherein the first heater is a water bath.

10. The vat heating device as claimed in claim 8, wherein the isolation layer is a transparent inorganic material or a transparent plastic material.

11. The vat heating device as claimed in claim 1, wherein the bottom plate is a transparent inorganic material or a transparent plastic material.

12. The vat heating device as claimed in claim 1, further comprising a third heater, and the third heater is embedded in a sidewall of the vat.

13. A photocuring three-dimensional molding system, comprising:
    a carrier;
    the vat heating device as claimed in claim 1; and
    a scanner disposed below the carrier, wherein the scanner projects a light source passing through the carrier, the vat and the heater to irradiate and cure the photosensitive resin within the vat.

14. The photocuring three-dimensional molding system as claimed in claim 13, wherein the first heater is a transparent conductive glass.

15. The photocuring three-dimensional molding system as claimed in claim 14, wherein the transparent conductive glass is indium tin oxide (ITO) glass or fluorine-doped tin oxide (FTO) glass.

16. The photocuring three-dimensional molding system as claimed in claim 13, wherein the first heater is embedded in a bottom of the vat.

17. The photocuring three-dimensional molding system as claimed in claim 16, further comprising a third heater, and the third heater is embedded in a sidewall of the vat.

18. The photocuring three-dimensional molding system as claimed in claim 13, wherein the light source is an ultraviolet light.

19. The photocuring three-dimensional molding system as claimed in claim 18, wherein the first heater has a transmittance of 70% to 85% in a spectral range of ultraviolet light.

20. The photocuring three-dimensional molding system as claimed in claim 13, further comprising a third heater, and the third heater is embedded in a sidewall of the vat.

* * * * *